(12) United States Patent
Ehrhardt

(10) Patent No.: US 10,000,055 B2
(45) Date of Patent: Jun. 19, 2018

(54) METHOD FOR OPERATING A PRINTING PRESS

(75) Inventor: Stephan Ehrhardt, Neulussheim (DE)

(73) Assignee: HEIDELBERGER DRUCKMASCHINEN AG, Heidelberg (DE)

( * ) Notice: Subject to any disclaimer, the term of this patent is extended or adjusted under 35 U.S.C. 154(b) by 488 days.

(21) Appl. No.: 13/459,429

(22) Filed: Apr. 30, 2012

(65) Prior Publication Data
US 2012/0272851 A1 Nov. 1, 2012

(30) Foreign Application Priority Data
Apr. 28, 2011 (DE) .................. 10 2011 018 858

(51) Int. Cl.
*G06F 3/12* (2006.01)
*B41F 33/16* (2006.01)
(Continued)

(52) U.S. Cl.
CPC .......... *B41F 33/16* (2013.01); *B41F 33/0009* (2013.01); *B41F 33/12* (2013.01); *B41P 2233/10* (2013.01)

(58) Field of Classification Search
CPC .... G06F 3/1275; G06F 3/1204; G06F 3/1208; G06F 3/1252; G06F 3/1264;
(Continued)

(56) References Cited

U.S. PATENT DOCUMENTS 4,346,446 A * 8/1982 Erbstein et al. ............... 702/182
4,984,773 A * 1/1991 Balban ................ B41F 33/0009
101/181
(Continued)

FOREIGN PATENT DOCUMENTS

CN 1367079 A 9/2002
CN 101085569 A 12/2007
(Continued)

OTHER PUBLICATIONS

Unnamed Author, "Lexmark E120,E120n User's Guide", Jul. 2005, pp. 1-87, Lexmark International, Inc., Lexington, Kentucky, USA.

*Primary Examiner* — Hai Phan
*Assistant Examiner* — Jonathan R Beckley
(74) *Attorney, Agent, or Firm* — Laurence Greenberg; Werner Stemer; Ralph Locher

(57) ABSTRACT

A method of operating a sheet-fed printing press includes storing various print jobs and/or associated setting values and process steps in a memory device to set up the printing press upon a job change. A computer implements or suggests settings or process steps of the printing press for a print job based on the job data of a print job and/or as a result of inputs by the operator. Before or immediately after a print job is completed, the computer generates a query requesting inputs that determine if the same print job requires further passes and if so, which passes are required and, based on the information input therein, implements only those settings on the printing press and/or initiates or suggests only those process steps that are necessary for the subsequent pass of the sheets that have already been printed.

13 Claims, 3 Drawing Sheets

(51) Int. Cl.
*B41F 33/00* (2006.01)
*B41F 33/12* (2006.01)

(58) Field of Classification Search
CPC ...... G06F 3/1256; G06F 3/1257; G06F 3/126; G06F 3/1207; G06F 3/1205; G06F 3/1206; B41F 1/00; B41F 1/10; B41F 1/12; B41F 1/66; B41F 19/00; B41F 19/007; B41F 33/00; B41F 33/0009; B41F 33/16; B41F 33/12; H04N 2201/3212; H04N 2201/3218; H04N 2201/3219; H04N 2201/3222; H04N 2201/3223; H04N 2201/0098; B41P 2233/10; B41P 2233/00; B41P 2233/13; G03G 15/235
USPC ........ 358/1.1, 1.15, 1.4, 1.6, 2.1, 3.21, 3.23, 358/540, 450, 3.24, 3.29, 3.32, 1, 1.12, 358/1.13, 1.16, 1.17, 1.18, 1.5, 515; 399/1, 4, 2, 8, 9, 11, 16, 17, 38, 42, 46, 399/53, 66, 75, 796, 77, 81, 82, 83, 85, 399/87, 130, 138, 148, 154, 156, 193, 399/194, 195, 361, 362, 363, 365, 388, 399/397, 401, 402, 404, 407; 347/101, 347/104; 101/93, 93.01, 90, 91, 93.08, 101/93.11, 93.18, 113, 450.1, 130, 463.1, 101/1, 71, 173, 186, 232, 476, 477, 483, 101/479, 481, 484, 490, 492, 494, 103, 101/229, 35, 485
See application file for complete search history.

(56) References Cited

U.S. PATENT DOCUMENTS

| | | | | |
|---|---|---|---|---|
| 5,845,576 | A * | 12/1998 | Junghans | B41F 31/14 101/352.09 |
| 5,964,156 | A * | 10/1999 | Smith | B41B 21/32 101/471 |
| 6,293,193 | B1 | 9/2001 | Bolza-Scheuenemann | |
| 6,411,314 | B1 | 6/2002 | Hansen et al. | |
| 6,705,229 | B2 | 3/2004 | Frankenberger | |
| 7,308,228 | B2 * | 12/2007 | Kagita | G03G 15/231 399/16 |
| 7,454,263 | B2 * | 11/2008 | Hauck | B41F 33/0009 700/117 |
| 7,561,290 | B2 * | 7/2009 | Uejo | B41F 33/16 358/1.13 |
| 7,567,360 | B2 * | 7/2009 | Takahashi | G06F 3/1205 358/1.15 |
| 7,640,500 | B2 * | 12/2009 | Pirie et al. | 715/274 |
| 7,679,777 | B2 * | 3/2010 | Contino | 358/1.6 |
| 8,134,733 | B2 * | 3/2012 | Morales | G06F 3/1275 358/1.13 |
| 8,146,492 | B2 | 4/2012 | Ikeda | |
| 8,194,270 | B2 * | 6/2012 | Takemoto | B41F 7/30 358/1.15 |
| 8,204,416 | B2 * | 6/2012 | Calamita et al. | 399/301 |
| 8,213,688 | B2 * | 7/2012 | Hauck | B41F 33/0045 382/112 |
| 8,311,903 | B2 * | 11/2012 | Rai | G06Q 10/087 705/22 |
| 8,493,611 | B2 | 7/2013 | Saito | |
| 8,687,207 | B2 * | 4/2014 | Berti | B41F 33/00 101/350.5 |
| 8,736,902 | B2 * | 5/2014 | Robinson | G03G 15/6529 358/1.9 |
| 2001/0052995 | A1 * | 12/2001 | Idehara | G06F 3/1204 358/1.15 |
| 2004/0090645 | A1 | 5/2004 | Berti et al. | |
| 2005/0028700 | A1 | 2/2005 | Hauck | |
| 2005/0213144 | A1 * | 9/2005 | Uejo | G06F 3/1206 358/1.15 |
| 2006/0227352 | A1 * | 10/2006 | Mamberer | 358/1.12 |
| 2008/0084574 | A1 * | 4/2008 | McDonald | G06Q 10/06 358/1.15 |

FOREIGN PATENT DOCUMENTS

| | | |
|---|---|---|
| CN | 101527768 A | 9/2009 |
| DE | 197 20 072 A1 | 1/1998 |
| DE | 196 33 237 A1 | 2/1998 |
| DE | 103 39 571 A1 | 3/2004 |
| DE | 10 2004 033 056 A1 | 2/2005 |
| DE | 10 2007 047 086 A1 | 4/2008 |
| DE | 10 2010 003 913 A1 | 10/2011 |
| EP | 0 908 803 A1 | 4/1999 |
| EP | 1155850 A2 | 11/2001 |
| WO | 99/32292 A1 | 7/1999 |

* cited by examiner

FIG. 3

| Process Step 40 | End Production 41 | Continue Last Job 42 | Printing Modes 43 Work and Turn | 44 Work and Back |
|---|---|---|---|---|
| Store Job | ■ |  |  |  |
| Ink Supply Off | ■ | ■ |  |  |
| Smoothen Ink Profile |  | ■ | ■ | ■ |
| Reduce Ink |  | ■ |  |  |
| Reset Register (Circumferential/Lateral/Diagonal) |  | ■ |  |  |
| Wash Rubber Blanket | ■ | ■ | ■ |  |
| Wash Impression Cylinder | ■ |  |  |  |
| Wash Inking Unit/Printing Plate | ■ |  |  |  |
| Wash Ductor | ■ |  |  |  |
| End Job | ■ |  |  |  |
| Apply Job (incl. Format) |  | ■ | ■ | ■ |
| Begin Job | ■ |  |  |  |
| Remove Plates | ■ |  |  |  |
| Mount Plates |  | ■ | ■ | ■ |
| Set Up Paper Travel |  | ■ | ■ | ■ |
| Ink Supply On |  | ■ | ■ | ■ |
| Ink Up 1 |  | ■ |  |  |
| Ink Up 2 |  |  |  |  |
| Start Production |  | ■ | ■ | ■ |
| Automatic Register Control |  | ■ |  |  |
| Turn Off Machine | ■ |  |  |  |

| Data Set for "Apply Job" |
|---|
| Job Data (Job Header + Condition/Speed) |
| Printing Data Material |
| Adjust Sheet Run |
| Color Data/Color Allocation |
| Powder/Dryer Data |
| Measuring Instruments - Data |

METHOD FOR OPERATING A PRINTING PRESS

CROSS-REFERENCE TO RELATED APPLICATION

This application claims the priority, under 35 U.S.C. § 119, of German Patent Application DE 10 2011 018 858.4, filed Apr. 28, 2011; the prior application is herewith incorporated by reference in its entirety.

BACKGROUND OF THE INVENTION

Field of the Invention

The invention relates to a method for operating a printing press or machine using a control computer and an associated memory in which machine settings for various print jobs can be stored.

In sheet-fed lithographic offset printing presses it has become known to store machine settings made by an operator on the machine for a specific print job and to re-use them for a so-called follow-up order in which the same print product is to be re-printed at a later point in time. More recently, methods have become known for setting up the printing press in an automated way even if the follow-up order is not identical with a stored job. For that case, U.S. Pat. No. 7,454,263 discloses a method wherein the properties of the new job to be printed are determined through the use of a software program from the job data of the new job. Based on the properties, setting operations are derived and displayed to the operator as suggestions in a dialog. Then the operator can accept, modify, or add to the propositions.

Furthermore, it is known from German Patent Application DE 10 33 9571 A1, corresponding to U.S. Patent Application Publication No. US 2004/0090645, to compare the data of a new print job with the data of the print job that was processed on the machine before and, based on the comparison, to modify or optimize the order of the operations required for the upcoming job change in order to minimize make-ready times.

All of those known approaches are intended to provide assistance to the operator with regard to complex operations to make the machine ready for a new print job. However, the known methods do not take into account that occasionally one and the same job may require multiple passes through the press, i.e. a sheet to be printed may need to successively pass through the same press multiple times. So far, for such a second, third, or $n^{th}$ pass, the operator had to make the necessary machine settings himself or herself based on his or her knowledge and skills, with the inherent risk of errors and maladjustments. That is because, depending on the type of the second or $n^{th}$ pass, the machine settings that require modification or need to remain the same vary widely.

SUMMARY OF THE INVENTION

It is accordingly an object of the invention to provide a method for operating a printing press, which overcomes the hereinafore-mentioned disadvantages of the heretofore-known methods of this general type and which simplifies and facilitates the setting of a printing press within the same print job requiring multiple passes.

With the foregoing and other objects in view there is provided, in accordance with the invention, a method of operating a sheet-fed printing press. The method comprises storing, in a memory device, various print jobs and/or associated setting values and/or process steps for setting up the printing press upon a job change, implementing or suggesting settings or process steps of the printing press for a print job, in a computer, based on job data of a print job and/or a result of inputs by an operator, even before or immediately after completion of a print job, generating a query, with the computer, requiring inputs determining if the same print job requires any further passes and if so which further passes are required, and implementing settings on the printing press and/or initiating or proposing process steps required for a subsequent pass of sheets having already been printed, with the computer, in accordance with information input into the computer.

In accordance with the method of the invention, before or after the completion of one pass, but in any case before the entire print job has been completed, a query is made to give the operator the opportunity to input the next pass for the ongoing print job. This is of particular importance when print jobs are printed on machines with few printing units, for instance if a four-color job is printed on a two-color press, if both sides of a product are to be printed on machines without a turning device, etc. Therefore, during the first pass of a print job, the operator will already be asked by the computer if the same print product requires further passes through the press. He or she will then be given various alternatives from which he or she can choose the next print pass to be carried out on the press. Alternatively, the computer may automatically determine the type of the subsequent print pass from the job data.

An advantage of this method is that the data and setting values already stored in the machine control unit for a specific print job do not need to be input or queried again. A further advantage is that for the next pass, frequently only part of the machine settings need to be changed, thus reducing the required set-up time.

The operations to be carried out in a further pass are referred to by pressmen as "print layouts" or different printing modes. They are listed and explained below:

1. Work and Turn:

In this mode, the same image is printed on both sides of the signature. Thus, the pile needs to be turned in such a way as to interchange the side edges. Accordingly, the sheets then need to be aligned against the side pull lay opposite the one they had been aligned against on the feeder table for the first pass through the printing press. During the second pass, this side pull lay needs to be activated and permanently addressed by the control unit.

2. Work and Back:

In this mode, a different image is printed on each side of the signature. The pile is likewise turned in such a way as to interchange the side edges, thus likewise requiring alignment against the side pull lay opposite the one used in the first pass. Since the image is different, however, the printing press requires different ink preset values and the printing plates need to be changed.

3. Work and Tumble:

In this mode, the same image is printed on both sides of the signature. The pile is turned in such a way as to interchange the leading edge and the trailing edge of the sheets as compared to the first pass. For this procedure the sheet travel does not need to be modified, which is to say that the side pull lays do not need to be changed.

4. Perfecting on a Straight Press:

In this procedure, a different image is printed on each side of the signature. The pile is turned in such a way that the leading edges and the trailing edges of the sheets are interchanged. This procedure again requires a change of plates and new ink preset values. In addition, the circumferential and lateral registers need to be readjusted. However, the side pull lays stay the same.

5. Printing in Multiple Passes:

In this mode, a print job is processed on a machine that has fewer printing units than the print job requires, for example an eight-color print job printed on a four-color press or a four-color job printed on a two-color press. Such a process requires corresponding plate changes and modifications of the ink preset values. However, since the inking units need to be supplied with ink of different colors, they need to be emptied completely, cleaned, and refilled in between the two passes. However, paper travel does not change.

6. Font/Language Changes:

In this mode, the printing plates that do not include text remain in the corresponding printing units. Printing plates that include text, however, for instance those in the printing unit printing with black ink, are replaced by printing plates carrying a different image. In general, paper travel and ink preset values do not change.

These options for second pass listed above are expediently presented for selection to the operator by the computer of the printing press once the operator has confirmed, for instance in a dialog box on the screen, that a further pass is required. In accordance with the mode of the subsequently selected second pass, specific settings required for the selected pass mode are directly carried out on the machine by the computer through the control unit of the machine, for instance an interchange of the side pull lays, the initiation of a plate changing operation, etc., whereas other process steps to set up the machine potentially require further inputs by the operator, i.e. the printer, who for the printing operation with a different image in the second pass, may for instance specify the ink zone preset values to be used or the previous job these values are to be taken from.

In accordance with a further embodiment of the method of the invention, the control unit may re-access the data of the current print job to determine therefrom the type of the next print job and to automatically calculate further data required for setting-up and processing the print job in the respective following pass from the available job data. In order to calculate the setting values of the printing press, it is furthermore possible to use data from similar print jobs processed in the past and the corresponding passes pertaining thereto as well as the setting values stored in the machine history.

The method of the invention is preferably implemented as software or firmware in the control computer of the printing press or on a separate personal computer or server that can communicate with the machine.

It is furthermore advantageous if the queries to the operator are given as a screen display or voice output. An advantage of the first option is that decision-making aids can be presented in visualized form. For example, several alternatives can be displayed as buttons, possible characteristic curves may be displayed as a graphic chart, or the setting operation itself may be outlined on an image of the printing press. In contrast, voice output is advantageous if the query relates to a simple decision requiring yes or no as an answer. Of course, it is likewise possible to combine voice output and visual representation. The inputs of the operator may likewise be made by speech and expediently on a touch screen, for example. Due to the high level of noise in the surroundings of printing presses, communication between the operator and the voice control preferably occurs through headsets, which may ideally communicate with the control computer through a wireless connection, thus enabling the operator to reply to simple queries even if he or she is not near the screen.

In accordance with a further expedient feature, the control computer may store the machine settings used during the implementation of the pass and/or of the process steps carried out during make-ready for the following pass. This makes it possible to reuse these settings and the sequence of the process steps for follow-up orders. In this context, the passes that are of different type or mode in one print job may be stored either separately or as modules under the respective print job and may be retrieved for follow-up orders individually or as a set.

In accordance with a concomitant mode of the invention, it is furthermore advantageous if the control computer informs the operator of the manual interventions that need to be carried out by the operator for the following pass and does not continue with the further process steps to be carried out automatically until the manual process steps or rather their completion is detected by the control computer for instance through the use of sensors, or confirmed by the operator himself or herself by a confirmation signal. That is because, during changeover operations between the various passes, manual intervention by the operator is frequently unavoidable. If, for example, there is no automatic plate changer at the printing units of the printing press, the printing plates need to be exchanged by hand. In this case, at a suitable point in time, the control computer prompts the operator to remove the printing plate from the plate cylinder in a specific printing unit of the printing press and to introduce a new printing plate.

Other features which are considered as characteristic for the invention are set forth in the appended claims.

Although the invention is illustrated and described herein as embodied in a method for operating a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a table containing a simplified illustration of a so-called job change list or pass change list including process steps required between two passes.

DETAILED DESCRIPTION OF THE INVENTION

Figure 1:
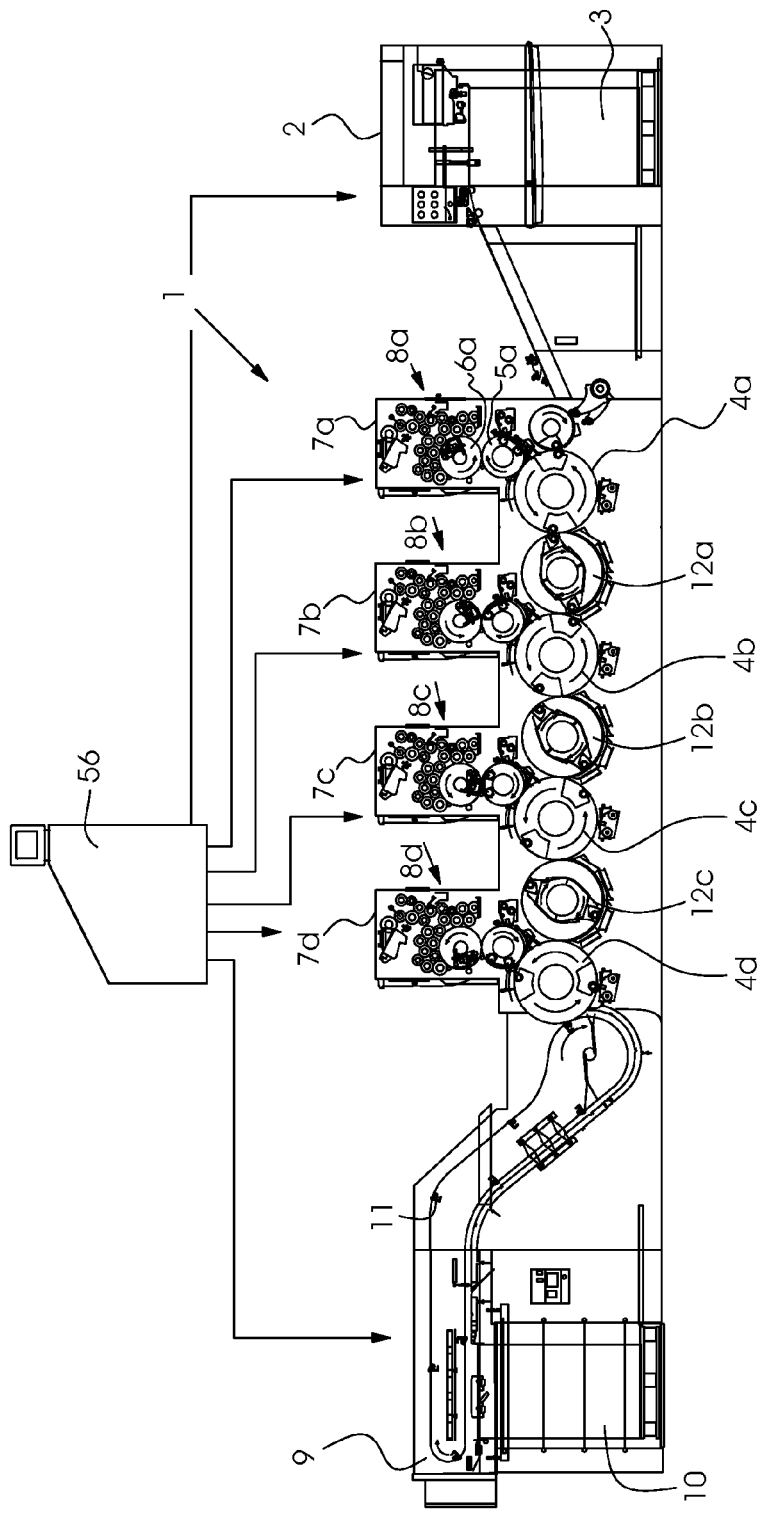
FIG. 1 is a diagrammatic, longitudinal-sectional view of a four-color lithographic offset printing press without a turning device, which is suitable for implementing the method of the invention.

Referring now to the figures of the drawings in detail and first, particularly, to FIG. 1 thereof, there is seen a lithographic offset printing press 1 of in-line construction including a feeder 2, which contains a pile 3 of unprinted paper, and four printing units 7a-d for the four process colors black, yellow, magenta and cyan. Transfer drums 12*a-c* are provided between the printing units in order to transfer the sheets to be printed to respective impression cylinders 4*b-d* of the printing units. The fourth printing unit 7*d* is followed by a delivery 9 of the printing press. The delivery 9 includes gripper bars 11 revolving through the use of a chain guide. These grippers bars 11 receive a printed sheet and transport it to a sheet pile 10 on which it is deposited.

Each of the four printing units 7*a-d* includes the respective impression cylinder 4*a-d*, a respective blanket cylinder 5*a* and a respective plate cylinder 6*a* carrying a respective printing plate. Ink is provided to the printing plates by respective inking units 8*a-d*.

The functions carried out in the printing units 7*a-d*, in the feeder 2 and in the delivery 9 are operated, controlled, and monitored from a machine control 56.

An assumption is made, for the following exemplary explanations, that the last job printed on the printing press 1 is nearing completion. The operator has now two options to exit a machine program for the current job. One option is to select a menu item "end production." This calls up a subroutine of the same name, causing the control unit to shut down the machine to a stand-by mode after the last sheet in the pile 3 has been processed. In the process, the following steps are carried out automatically, controlled by the computer:
1. Storing the job;
2. Interrupting the ink feed;
3. Smoothing the ink profile and reducing the thickness of the ink layer;
4. Initiating washing operations to wash the blanket and impression cylinders;
5. Washing the printing plate and the inking unit.
Finally, the machine is switched off.

The second option is to "release" the print job. If this option is selected by pressing the corresponding menu button, the job number of the subsequent job can be input and the job data thereof will then be uploaded to the memory of the machine control 56. We now assume that the next job to be printed on the four-color sheet-fed printing press shown in FIG. 1 is an eight-color print job. This means that the print job requires the sheets passing through the machine to be printed on the first side in a first pass, to be deposited on the pile 10 in the delivery and subsequently to be reintroduced into the feeder 2 in the place of the pile 3 to start the second pass. Since the job number is different from that of the previous job, the program will jump to the "standard job change" subroutine, in which the operator can retrieve the data of previous jobs as is known in the art, for example in the case of a follow-up order. Using either the retrieved data from a previous job, new data and settings inasmuch as they have been included in the job and are available in the job data, or settings contributed by the operator based on his or her experience and skills, the printing press 1 is made ready for the first pass in which the sheets are printed on the front side.

Figure 2:
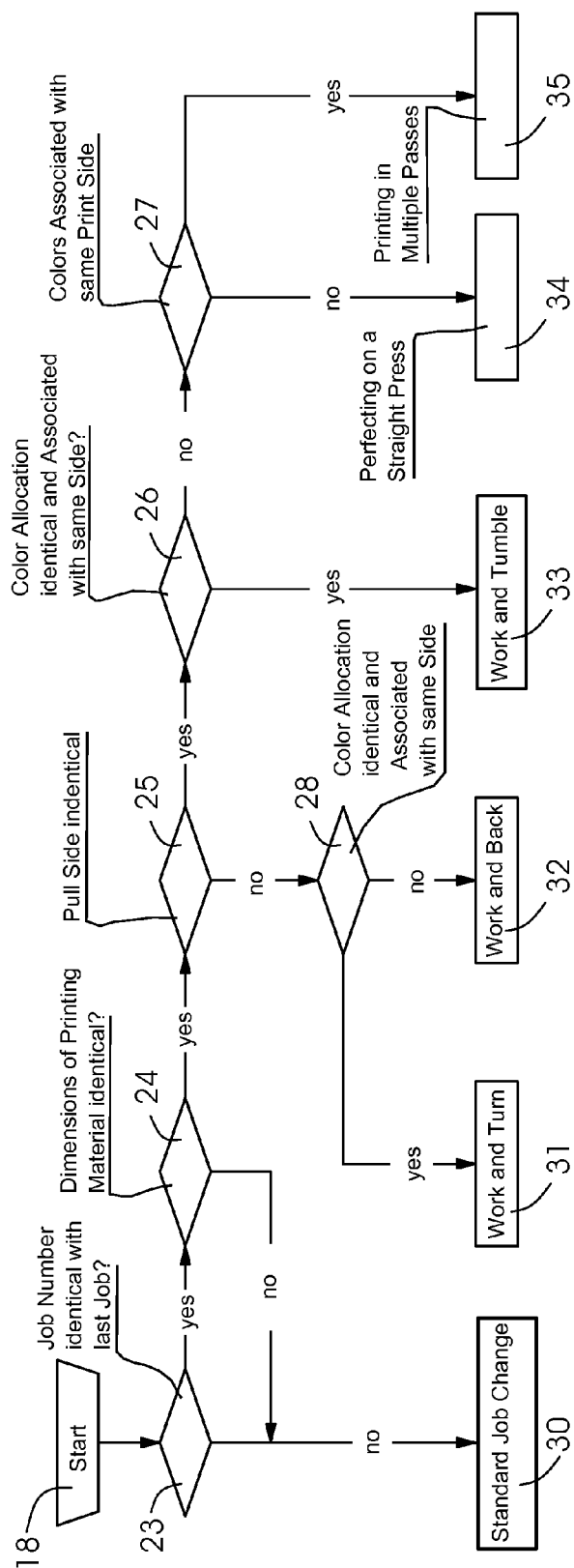
FIG. 2 is a flow chart illustrating various program steps for the method of the invention.

The computer of the machine control 56 of the printing press is programmed to assist the operator of the machine 1 through the use of a suitable program as he or she changes the machine over for the second pass. The program sequence is shown in FIG. 2: the printer exits the program of the first pass, which is nearing completion, using the release button. He or she will be offered the job change menu in which he or she can input the job number of the next job (box 18: program start). In the assumed case, the job number does not change, because the second pass belongs to the same job. Thus, at this point, the current job number is confirmed. The computer of the machine control 56 will then compare the confirmed or newly input job number with the one that belongs to the order that has just been processed (diamond 23).

However, since the job numbers are identical, the control computer now starts to analyze the job to find out whether or not further passes of the sheets that have just been printed are expedient. In a first plausibility check (diamond 24), the job data are checked in terms of whether or not the length, width and thickness of the printing material, i.e. the sheets, for the following pass correspond to those of the last pass. If this is not the case, the control will return to the "job change" subroutine described above. In the other case, i.e. if the plausibility check finds identity, a query is made as to whether or not the job data for the second pass specify the same pull side as for the first pass (diamond 25). If this is not the case, the second pass is either of the "work and turn" or of the "work and back" type, and a query will be made to find whether or not the color allocation is identical with the first pass and associated with the same side as in the first pass. If the result of the comparison is that this is the case, the machine control moves to the "work and turn" subroutine. If the result is that this is not the case, it will move to the "work and back" subroutine (32).

In the other case, if the pull sides are identical, the following query is again whether or not the color association of the previous pass is identical with the following pass and associated with the same side (diamond 26). If this is the case and consequently the reply is "yes", the control switches to the "work and tumble" subroutine (box 33). However, if this is not the case, a query is made as to whether or not at least the colors are associated with the same printing side (diamond 27). If this is neither the case, the control switches to the "perfecting on a straight press" printing mode. Yet if the answer to the query made in decision diamond 27 is yes, the control switches to the "perfecting on a straight press" subroutine (box 35).

In this way, the software of the computer of the machine control 56 automatically determines the printing mode for the second pass based on the job data and can then carry out the process steps and make the settings that are necessary to change the machine over to such a printing mode.

In a further exemplary embodiment, which will not be described in great detail herein, such an automatic analysis of the job data can be dispensed with. Instead, once the job numbers have been compared, five buttons corresponding to the five printing modes 31-35 illustrated in FIG. 2, for example, may be presented to the operator on the screen for confirmation. Thus, based on his or her experience and knowledge of the current job, the operator may select the type of the second pass, i.e. the printing mode for the second pass.

The result of the selection of the printing mode is that the job change list or pass change list is adapted to correspond to the next printing mode. This process will now be explained with reference to FIG. 3. The left column of the diagram lists the important process steps required to change the machine 1 over to a new print job as well as the data sets to be applied (column 40). The hatched cells in the next column 41 indicate the process steps required for the "end production" subroutine. A closer look reveals the following sequence: store job—interrupt ink supply—smoothen ink profile—reduce ink in total—wash blanket—wash impression cylinder—wash inking unit—wash printing plate—set program status to "end job"—switch off machine.

In the "continue last job" subroutine of column 42, such shut-down and cleaning operations are not necessary.

Instead, the machine immediately restarts by applying the job and switching to the job start, whereupon the paper travel will immediately be set up, the ink supply will be switched on, inking up will be initiated, the production will be resumed, and automatic register control will be switched on in the course of the production. Moreover, all data concerning job, printing material, sheet travel, ink, powder, measuring devices, etc. from the previous job will be applied.

By way of example, the hatched cells in columns 43 and 44 list the process steps required for a second pass in the "work and turn" and "work and back" printing modes. The hatched cells indicate those steps and only those that appear in the job list:

For the "work and turn" procedure, only few changeover operations are required. The ink supply is switched off, the application of the sheet format is moved forward, and the blanket is washed. Once the data for the second pass have been applied, the paper travel is set up and the ink supply is switched back on. Renewed inking up is not necessary since the ink profile in the inking unit stays the same.

In contrast, the "work and back" printing mode (column 44) includes a lot more process steps in the pass change list. These steps are the following: ink supply off—smoothen ink profile—reduce amount of ink—apply pile format—reset circumferential register—reset lateral register—reset diagonal register—wash blanket—wash inking unit—wash plate—wash ink fountain roller—until the program item "job completed" is reached and the new job is applied. Subsequently, the plates are removed, new plates are mounted, the transfer drums are adjusted, paper travel is set up, the ink supply is switched on again, and the inking unit is inked up again before the production is started, during which the autoregister is to be controlled. All of these operations appear in the associated pass list and are partly carried out automatically by the machine control and partly by the operator, for instance the steps of removing the plates, mounting new plates and filling the ink fountains with ink if there is no automatic ink supply system provided on the machine.

In terms of the process steps to change over the machine, the "perfecting on a straight press" and "work and tumble" printing modes only differ from the "work and turn" and "work and back" procedures in a few aspects. Compared to the "work and turn" or "work and back" modes, for instance, the "perfecting on a straight press" mode does not require a readjustment of the paper travel since the sheets are pulled to the same side. Once the printing mode for the second pass has been determined, a large part of the process steps to change over the machine are carried out automatically by the control unit of the machine. For the second pass, the machine is kept in the original state as far as possible, and only those process steps and modifications that are absolutely necessary for the second pass need to be carried out. As compared to the known methods in which the operator has to reset the machine from zero after it has been shut down (column 41, "end production"), these two aspects result in much shorter make-ready times for jobs with multiple passes.

The invention claimed is:

1. A method of operating a sheet-fed printing press controlled by a computer, the method comprising the following steps:
   storing, in a memory device of the computer, at least one print job;
   implementing settings of the printing press for the at least one print job, in the computer, based on job data of the at least one print job;
   printing sheets in a first pass of the at least one print job on the printing press;
   after completion of the first pass of the sheets of the at least one print job, generating a query, with the computer, requiring inputs determining if the at least one print job requires any further passes of the same at least one printing job and if so which further passes are required by listing, via the computer, possible types of further printing passes of the same at least one printing job for selection;
   after having input about a type of a next printing pass of the same at least one printing job, generating, by the computer, a modified job change list including only settings and process steps being necessary for the next printing pass of the same at least one printing job; and
   implementing, via the computer, settings on the printing press required for a subsequent pass of sheets of the same at least one printing job having already been printed, with the computer, in accordance with information input into the computer to control the printing press; and
   printing the sheets in the subsequent pass of the same at least one printing job on the printing press.

2. The method according to claim 1, wherein the computer automatically sets up the printing press in accordance with the generated modified job change list.

3. The method according to claim 1, which further comprises displaying the generated modified job change list to an operator, with the computer, in a manner permitting input changes by the operator pertaining to a content or sequence of the process steps.

4. The method according to claim 1, which further comprises including at least one of the following types or printing modes in further printing passes:
   work and turn,
   work and back,
   work and tumble,
   perfecting on a straight press,
   printing in multiple passes, or
   change of font or language.

5. The method according to claim 4, wherein printing passes of a different type/mode of a respective job are stored separately or as modules under the respective job and are retrievable individually or as a set for follow-up orders.

6. The method according to claim 1, which further comprises presenting queries generated by the computer visually or as voice outputs and effecting inputs of an operator using a keyboard, a touch screen or voice control.

7. The method according to claim 1, wherein the computer alerts an operator to an implementation of manual process steps and does not continue with further settings and process steps until the manual process steps have been carried out.

8. A method of operating a sheet-fed printing press controlled by a computer, the method comprising the following steps:
   storing, in a memory device of the computer, at least one print job;
   implementing settings of the printing press for the at least one print job, in the computer, based on job data of the at least one print job;
   printing sheets in a first pass of the at least one print job on the printing press;
   after completion of a first pass of the sheets of the at least one print job, generating a query, with the computer, requiring inputs determining if the at least one print job requires any further passes of the same at least one printing job and if so which further passes of the same at least one printing job are required by automatically determining, with the computer, a type of a next printing pass of the same at least one printing job from the job data;

based on the determined type, generating, by the computer, a modified job change list only including those settings and process steps being necessary for the next printing pass of the same at least one printing job;

implementing, via the computer, the settings on the printing press required for a subsequent pass of sheets of the same at least one printing job having already been printed, with the computer, in accordance with the determined type to control the printing press; and printing the sheets in the subsequent pass of the same at least one printing job on the printing press.

9. The method according to claim 8, wherein the computer automatically sets up the printing press in accordance with the generated modified job change list.

10. The method according to claim 8, which further comprises including at least one of the following types or printing modes in further printing passes:
work and turn,
work and back,
work and tumble,
perfecting on a straight press,
printing in multiple passes, or
change of font or language.

11. The method according to claim 10, wherein printing passes of a different type/mode of a respective job are stored separately or as modules under the respective job and are retrievable individually or as a set for follow-up orders.

12. The method according to claim 8, which further comprises presenting queries generated by the computer visually or as voice outputs and effecting inputs of an operator using a keyboard, a touch screen or voice control.

13. The method according to claim 8, wherein the computer alerts an operator to an implementation of manual process steps and does not continue with further settings and process steps until the manual process steps have been carried out.

* * * * *